Feb. 1, 1955
H. ANDREWS
2,701,295
WATER HEATER STRUCTURE
Filed Feb. 1, 1954
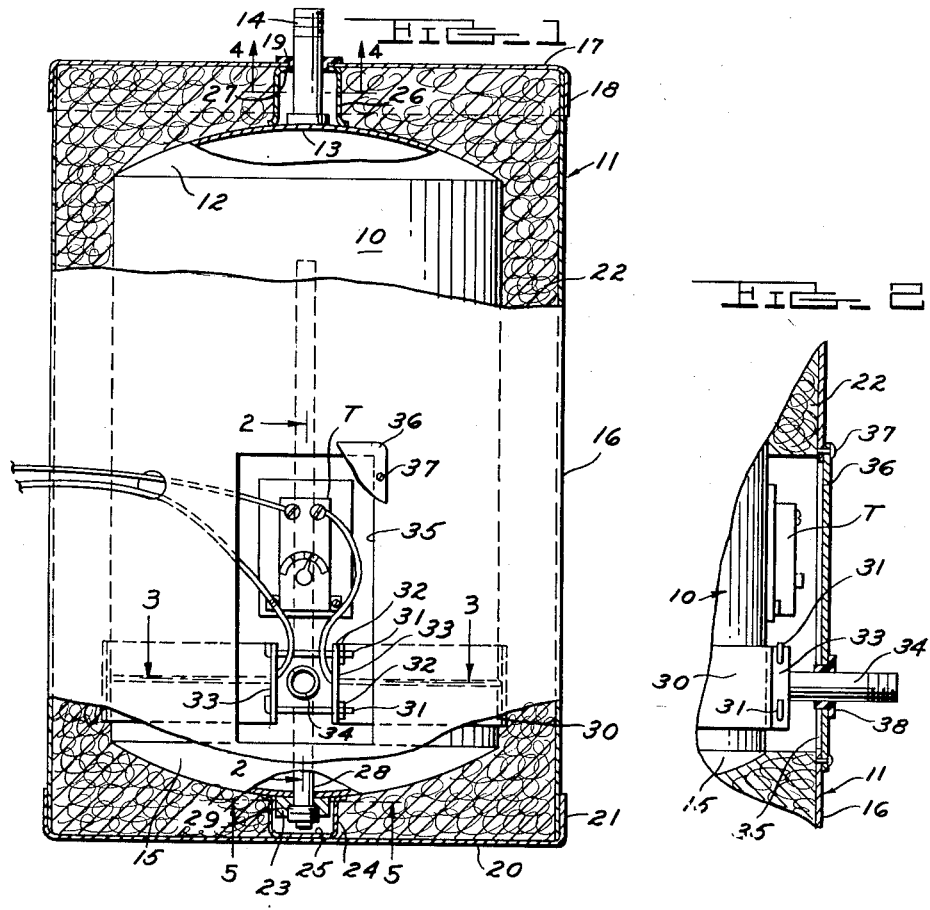
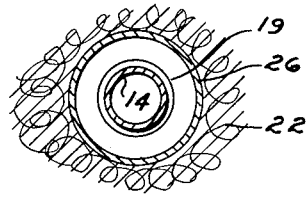
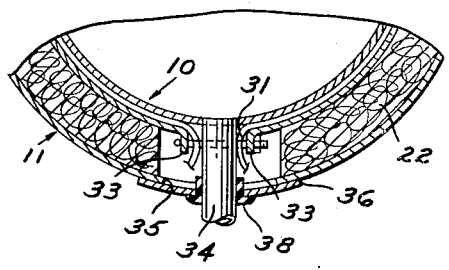
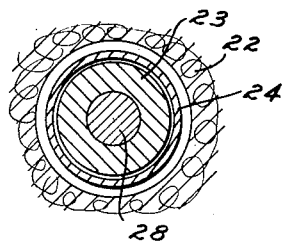
INVENTOR.
Henry Andrews
BY
Whitmore, Hulbert & Belknap
ATTORNEYS United States Patent Office 2,701,295
Patented Feb. 1, 1955

2,701,295

WATER HEATER STRUCTURE

Henry Andrews, Lansing, Mich., assignor to Piatt Products Corporation, Lansing, Mich., a corporation of Michigan Application February 1, 1954, Serial No. 407,268

4 Claims. (Cl. 219—38)

This invention relates generally to tank type liquid heaters and refers more particularly to improvements in water heaters.

Heating equipment of the type to which the present invention pertains usually comprises a tank adapted to contain the liquid to be heated and a casing or shell which encloses the tank. The casing is ordinarily of a size substantially greater than the tank and the latter is supported within the casing in a manner such that the walls of the tank are spaced a substantial distance from the adjacent walls of the casing. In order to improve the efficiency of such heaters it is the practice to fill the space between the walls of the tank and the walls of the casing with a heat insulating material.

In many liquid heaters of the above general type, the insulating material is relied upon to also centralize the tank within the casing or, in other words, to hold the tank in a position such that the walls of the latter are spaced from the adjacent walls of the casing. This arrangement is objectionable because the insulating material ordinarily provided is compressible to an appreciable extent and thereby is incapable of affording a stable mounting for the tank. Moreover, in cases where mineral or glass wool insulation is used, the effectiveness of the insulation is substantially reduced as a result of compressing or compacting the insulation.

With the above in view, it is an object of the present invention to not only provide a stable support for the tank within the casing but to also positively locate the tank with the walls thereof in proper spaced relationship to the adjacent walls of the casing. In accordance with the present invention, both of the above functions are accomplished independently of the insulating material and without detrimentally affecting the efficiency of this material.

It is another object of this invention to provide a heating element of the electrical resistance type in the form of a band which encircles the tank immediately adjacent the bottom of the latter and has the free end portions spaced from one another circumferentially of the tank to accommodate the usual water intake conduit. This construction renders it possible to locate the heating element in closer relationship to the bottom of the tank with the result that the volume of water at the bottom of the tank below the heating element is more readily heated.

It is a further object of this invention to provide the casing with an access opening directly opposite the cold water inlet conduit with the result that the latter conduit may be extended through the access opening for connection with the water supply. Thus, it is not necessary to provide a separate opening in the casing for the cold water supply conduit and in addition the fastening means for the band type heating element are rendered accessible through said opening.

It is a still further object of this invention to provide a liquid heater of the above general type wherein provision is made for supporting an anode rod on the centering means located at one end of the tank.

The foregoing as well as other objects will be made more apparent as this description proceeds especially when considered in connection with the accompanying drawing, wherein Figure 1 is a side elevational view partly in section of a liquid heater constructed in accordance with this invention;

Figure 2 is a fragmentary sectional view taken substantially on the line 2—2 of Figure 1;

Figure 3 is a fragmentary cross sectional view taken on the line 3—3 of Figure 1;

Figure 4 is a cross sectional view taken on the line 4—4 of Figure 1; and

Figure 5 is a cross sectional view taken on the line 5—5 of Figure 1.

The liquid heater selected herein for the purpose of illustration comprises a tank 10 constructed to accommodate a substantial volume of liquid under pressure, and a casing 11 enclosing the tank 10. The tank 10 is circular in cross section and is closed at the top by a wall 12 having an outlet opening 13 at the geometric center thereof. A discharge conduit or nipple 14 is secured at its lower end to the top wall 12 of the tank 10 in registration with the outlet opening 13, and extends outwardly through the top wall of the casing 11 to be presently described. The bottom of the tank 10 is closed by a wall 15 which is similar to the top wall 12.

The casing 11 has a cylindrical wall 16 which encircles the side wall of the tank and is of a diameter substantially greater than the side wall of the tank. The opposite ends of the casing side wall 16 respectively project beyond the adjacent ends of the tank 10, and the top of the casing 11 is closed by a cap 17. The cap 17 has a marginal depending flange 18 which telescopes over the upper end of the wall 16 and is welded or otherwise secured to the wall 16. The cap 17 has a centrally located opening therethrough for receiving the discharge conduit or nipple 14 and a rubber or similar type grommet 19 is provided to seal the space around the conduit 14. The lower end of the casing 11 is closed by a cap 20 having an upstanding marginal flange 21 which telescopes over the bottom portion of the wall 16 and is welded or otherwise permanently secured to the wall 16.

The tank 10 is centrally supported within the casing 11 in a manner such that the walls of the tank are spaced from the adjacent walls of the casing 11 and suitable insulating material such for example as mineral or glass wool 22 is housed within the casing 11 around the tank 10. The supporting means for the tank at the bottom of the latter comprises a fitting 23 and a cup-shaped member 24. The fitting 23 is in the form of a circular block which is welded or otherwise permanently secured to the bottom surface of the end wall 15 at the geometric center of the latter. The cup-shaped member 24 has a base 25 which is welded or otherwise secured to the top surface of the bottom cap 20 and the side wall thereof projects upwardly from the base 25 into contact with the bottom wall 15 of the tank 10. The cup-shaped member 24 is centrally located with respect to the bottom cap 20 and is of sufficient diameter to receive the fitting 23 on the bottom wall 15 of the tank 10. It follows from the above that the cup-shaped member 24 supports the tank 10 with its bottom wall 15 in proper spaced relationship to the cap 20 on the bottom of the casing, and that the fitting 23 cooperates with the side wall of the cup-shaped member 24 to hold the bottom portion of the tank 10 against lateral shifting movement relative to the casing 11.

The support for the top of the tank 10 comprises an inverted cup-shaped member 26 having a base 27 welded or otherwise suitably secured to the bottom surface of the cap 17 at the geometric center of the cap. The cup-shaped member 26 is located to receive the discharge conduit or nipple 14 and the base 27 has an opening therethrough enabling extending the discharge conduit 14 through the same. The annular side wall of the cup-shaped member 26 projects downwardly into contact with the top wall 12 of the tank 10, and hence cooperates with the cup-shaped member 24 to hold the tank 10 against movement axially relative to the casing 11. Lateral shifting movement of the top of the tank 10 relative to the casing 11 is prevented by engagement of the discharge conduit or nipple 14 with the cup-shaped member 26. As a result, the tank 10 is firmly held against shifting movement in any direction relative to the casing 11 independently of the insulating material 22.

In certain types of liquid heaters it is desirable to provide the tank 10 with an anode. In cases where an anode is specified the bottom wall 15 of the tank 10 is fashioned with an opening aligned with an opening through the fitting 23. Both openings are of a size to enable extending an anode 28 upwardly through the openings into the tank 10, as shown in Figure 1 of the drawing. The opening through the fitting 23 has a threaded counterbore at the lower end and the anode 28 has an enlargement 29 externally threaded for threadably engaging the counterbore.

The tank 10 is heated electrically by an electrical resistance element in the form of a band 30 encircling the tank 10 immediately adjacent the bottom of the tank and having the free ends spaced from each other circumferentially of the tank. The band 30 is clamped to the tank 10 by fastener elements comprising studs 31 having heads at one end and nuts 32 threadably mounted on the opposite ends of the studs. The studs 31 extend through openings in flanges 33 turned laterally outwardly from the free ends of the band 30. The heads of the studs 31 engage the flange at one end of the band 30 and the nuts 32 engage the flange at the opposite end of the band in a manner to cooperate with the heads to draw the band tightly against the tank 10. The operation of the heating element or band 30 is controlled by an adjustable thermostat T suitably mounted on the tank 10 immediately above the ends of the band 30.

The lateral spacing of the adjacent ends of the band 30 enables extending the liquid inlet conduit or nipple 34 between the ends of the band, and thereby renders it possible to position the band 30 in closer relationship to the bottom wall 15 of the tank 10. This is desirable in that it provides maximum heating at the region the liquid enters the tank and assures effectively heating the liquid contained in the bottom portion of the tank. The inner end of the inlet conduit 34 communicates with the interior of the tank and the outer end of this conduit projects through an access opening 35 in the wall 16 of the casing 11.

The access opening 35 in the wall 16 of the casing 11 is of sufficient size to enable ready access to both the thermostat T and the fastener elements for the heating element or band 30. A closure 36 is provided for the access opening 35 and quickly removable attaching elements 37 are provided for detachably securing the closure 36 to the wall 16 of the casing 11. The liquid supply or inlet conduit 34 projects through an opening in the closure 36, and a rubber grommet 38 is provided for sealing the space between the conduit 34 and adjacent edge of the opening through the closure.

It follows from the foregoing that a liquid heater constructed in accordance with this invention is composed of a relatively few simple parts capable of being inexpensively manufactured and assembled. It is also apparent that while the various parts of the heater are exceptionally simple in design, nevertheless, these parts cooperate to provide the advantageous features previously described.

What I claim as my invention is:

1. A liquid heater comprising a tank for a liquid, a casing enclosing the tank and having walls spaced from the adjacent walls of the tank, heat insulating material arranged in the space provided between the tank and casing, a first member depending from the bottom wall of the tank at substantially the geometric center of the bottom wall of said tank and fixed relative to the bottom wall of the tank, an upwardly opening cup-shaped member having its base secured to the bottom wall of the casing and having the upper end engageable with the bottom wall of the tank for supporting the tank within the casing independently of the heat insulating material, said first member extending into the cup-shaped member and cooperating with the side wall of the cup-shaped member to hold the tank against lateral shifting movement relative to the casing.

2. The structure defined in claim 1 comprising an anode rod extending upwardly into the tank through aligned openings in the first member and bottom wall of the tank, and means housed within the cup-shaped member and securing the lower end of the rod to the first member.

3. A liquid heater comprising a tank adapted to contain a liquid to be heated, a casing enclosing the tank, means supporting the tank within the casing with the walls of the tank spaced from adjacent walls of the casing, an electrical resistance type heating element encircling the tank in heat transfer relationship to the tank and having the ends spaced laterally from one another, and a conduit for fluid extending outwardly from the tank between the spaced ends of the heating element and projecting through the adjacent wall of the casing.

4. A liquid heater comprising a tank adapted to contain a liquid to be heated, a casing enclosing the tank, means supporting the tank within the casing with the walls of the tank spaced from adjacent walls of the casing, an electrical resistance type heating element in the form of a band encircling the tank adjacent the bottom of the tank and having the ends spaced from one another circumferentially of the tank, removable fastening means engageable with the free ends of the band for clamping the band to the tank, a conduit for fluid extending outwardly from the tank between the free ends of the band, an access opening in the casing through which the conduit projects and being of a size to expose the fastening means for the band, and a cover for the access opening removably secured to the casing and apertured to receive said conduit.

References Cited in the file of this patent

UNITED STATES PATENTS

| | | |
|---|---|---|
| 2,367,369 | Osterheld | Jan. 16, 1945 |
| 2,459,123 | Bates et al. | Jan. 11, 1945 |
| 2,498,950 | Fowler | Feb. 28, 1950 |
| 2,510,456 | Biebel | June 6, 1950 |